US009432998B2

(12) United States Patent
Maniatis et al.

(10) Patent No.: US 9,432,998 B2
(45) Date of Patent: Aug. 30, 2016

(54) CONTROLLING A RADIO RESOURCE CONTROL CONNECTION BETWEEN A BASE STATION AND A USER EQUIPMENT

(75) Inventors: Ioannis Maniatis, Unterensingen (DE); Hans Kroener, Geislingen-Weiler (DE); Wolfgang Payer, Ulm (DE)

(73) Assignee: Nokia Solutions and Networks Oy, Espoo (FI)

( * ) Notice: Subject to any disclaimer, the term of this patent is extended or adjusted under 35 U.S.C. 154(b) by 84 days.

(21) Appl. No.: 14/388,317

(22) PCT Filed: Mar. 28, 2012

(86) PCT No.: PCT/EP2012/055500
§ 371 (c)(1),
(2), (4) Date: Sep. 26, 2014

(87) PCT Pub. No.: WO2013/143586
PCT Pub. Date: Oct. 3, 2013

(65) Prior Publication Data
US 2015/0050935 A1 Feb. 19, 2015

(51) Int. Cl.
*H04W 72/04* (2009.01)
*H04W 36/00* (2009.01)
*H04W 76/06* (2009.01)

(52) U.S. Cl.
CPC ....... *H04W 72/048* (2013.01); *H04W 36/0011* (2013.01); *H04W 76/068* (2013.01)

(58) Field of Classification Search
CPC ......... H04W 36/0011; H04W 72/048; H04W 76/068
See application file for complete search history.

(56) References Cited

U.S. PATENT DOCUMENTS

| 2009/0225709 | A1* | 9/2009 | Wager | H04W 72/0413 370/329 |
| 2013/0194941 | A1* | 8/2013 | Lu | H04W 52/0254 370/252 |
| 2013/0201851 | A1* | 8/2013 | Chou | H04W 24/02 370/252 |
| 2014/0334369 | A1* | 11/2014 | Kaikkonen | H04W 52/0216 370/311 |
| 2015/0030001 | A1* | 1/2015 | Koskinen | H04W 8/08 370/331 |

OTHER PUBLICATIONS

3GPP TR 36.822 V0.2.1 (Feb. 2012), "$3^{rd}$ Generation Partnership Project; Technical Specification Group radio Access Network; LTE RAN Enhancements for Diverse Data Applications (Release 11)", 42 pgs.

(Continued)

*Primary Examiner* — Kashif Siddiqui
(74) *Attorney, Agent, or Firm* — Harrington & Smith

(57) ABSTRACT

It is described a method for controlling a radio resource control connection between a base station and a user equipment, wherein a radio resource control connection between the base station and the user equipment is established for exchanging control messages between the base station and the user equipment the control messages being required for an application running on the user equipment. The method includes determining a first value being indicative for a mobility characteristic of the user equipment and a second value being indicative for a data traffic characteristic of the user equipment, comparing the first value and the second value, setting a release timer based on the comparison, and controlling the radio resource control connection based on the release timer, wherein the radio resource control connection will end upon expiry of the release timer.

20 Claims, 2 Drawing Sheets

(56) References Cited

OTHER PUBLICATIONS

3GPP TSG-RAN WG2 #77. Dresden, Germany, Feb. 6-10, 2012, Tdoc R2-120449, "Analyses of RRC Connection Handling", Ericsson, ST-Ericsson, 10 pgs.

Baghel, Sudhir Kumar, et al., "An Investigation into Traffic Analysis for Diverse Data Applications on Smartphones", © 2012 IEEE, 5 pgs.

* cited by examiner

CONTROLLING A RADIO RESOURCE CONTROL CONNECTION BETWEEN A BASE STATION AND A USER EQUIPMENT

FIELD OF INVENTION

The present invention relates to the field of cellular networks, especially to radio resource control connections within such networks, and in particular to radio resource control connections between a base station and a user equipment running an always-on application.

ART BACKGROUND

In cellular network systems, in particular in a global view, the overall volume of data traffic has come to exceed the overall volume of voice traffic. In addition, the sales of smart phones have been growing over the last years. A typical traffic pattern of smart phones is the sporadic transmission and/or reception of small data packets (in the amount of a few kBs), called heartbeats, followed by a longer period of data inactivity. When a heartbeat is due for transmission, smart phones setup a radio resource control (RRC) connection (if they are in idle state), exchange the data with the (always-on type of) application over the network and release the RRC connection when all data is exchanged. This process is repeated whenever the smart phone needs to update its status with the currently running application(s). This of course results in a high number of RRC connection setups and releases, thus, in a much larger amount of control signalling as compared to the amount of exchanged data.

A discontinuous reception (DRX) operation in an RRC connected state offers the possibility of battery savings and at the same time relaxes the control signalling problem by keeping DRX capable UEs RRC connected for a longer period of time, i.e. smart phones do not have to setup the RRC connection every time. However, this DRX approach in the RRC Connected state may provide disadvantages when mobility becomes a factor for the UEs under consideration. In such a case, keeping the UE longer RRC connected means that handovers (HOs) must be executed, the frequency of the HO depending of course on the UE speed and the cell size on UE's route. If the fact is considered that in terms of control signalling, a HO procedure outweighs the RRC connection (release and setup) procedure, and then one problem is exchanged by another.

There may be a need for an improved system and method being adapted to provide an efficient control of a radio resource connection avoiding the above mentioned problems.

SUMMARY OF THE INVENTION

This need may be met by the subject matter according to the independent claims. Advantageous embodiments of the present invention are described by the dependent claims.

According to a first aspect of the invention there is provided a method for controlling a radio resource control connection between a base station and a user equipment, wherein a radio resource control connection between the base station and the user equipment is established for exchanging control messages between the base station and the user equipment, the control messages being required for an application running on the user equipment. The method comprises determining a first value being indicative for a mobility characteristic of the user equipment and a second value being indicative for a data traffic characteristic of the user equipment, comparing the first value and the second value, setting a release timer based on the comparison, and controlling the radio resource control connection based on the release timer, wherein the radio resource control connection will end upon expiry of the release timer.

This aspect of the invention is based on the fact that, in particular for always-on applications running on the user equipment, keep-alive messages are required and will be transmitted regularly. This may either add a high rate of connection setups and releases, if the connection is ended after each transmission or, if the user equipment stays connected and is moving within the network, eventually a high rate of handovers. Thus, this aspect intends to reduce, as far as possible, the rate of handovers and the rate of connection setups and releases. In other words, it intends to provide a solution based on a decision for a specific user equipment, whether to maintain the connection and to accept eventually handovers, or whether to release the connection and to accept new connection setups.

The context of the invention may relate to LTE and to discontinuous reception (DRX) operation in an RRC_Connected state specified in LTE Rel-9. In the following, it will be referred in particular to smart phones running always-on type of applications during DRX operation in RRC_Connected state. However, the invention should not be seen as being limited to this kind of applications. Always-on applications require the periodic transmission and/or reception of keep-alive messages, in the following called heartbeats, by the smart phones. Depending on DRX availability, user equipment (UE) mobility and UE traffic characteristics, these rather small sized data packets (the heartbeats) can cause a higher amount of control signalling to the eNodeB or base station as compared to the actual amount of data exchanged over the air.

This aspect of the invention is based on the idea to provide a solution for containing the abovementioned control signalling caused by smart phone traffic within manageable levels for the eNodeB.

As already mentioned above, globally, the overall volume of data traffic has come to exceed the overall volume of voice traffic. In addition, the sales of smart phones have been growing over the last years. A typical traffic pattern of smart phones is the sporadic transmission and/or reception of small data packets (few kBs), called heartbeats, followed by a longer period of data inactivity. When a heartbeat is due for transmission, smart phones setup a RRC connection (if the smart phone is in idle state), exchange the data with the (always-on type of) application over the network and release the RRC connection when all data is exchanged. This process is repeated whenever the smart phone needs to update its status with the currently running application(s).

As discussed, this may result in a high number of RRC connection setups and releases and thus in a much larger amount of control signalling as compared to the amount of exchanged data. However, when keeping the connections for a longer time period, this may result in some other issues, when the UEs are mobile and travelling inside the network. In such a case, keeping the UE longer RRC_Connected means that handovers (HOs) must be executed. If the fact is considered that in terms of control signalling a HO procedure outweighs the RRC Connection (Release and Setup) procedure, one problem is traded for another.

In general, the following signalling is required for UEs being in RRC_connected state (connected mode DRX (cDRX) on) or in RRC_idle state (cDRX off, although DRX operation is still available), i.e., not connected.

cDRX is not switched off every time the UE has to transmit/receive data. When cDRX is configured and downlink data is due for transmission to this UE, the network waits for the next OnDuration (phase of activity) of the cDRX cycle where the UE is listening, and transmits the data. In the uplink, the UE can communicate with the network at any time. After all data is exchanged, the UE continues to follow the configured cDRX cycle and stays RRC_Connected.

When uplink data is up for transmission, UE may need to communicate to the eNodeB or base station via a scheduling request indicating the existing data. eNodeB may reply with the corresponding transmission grant assigned to the UE. When downlink data is up for transmission, the eNodeB may only transmit the data to the UE in the activity phase of the cDRX cycle, where the UE is monitoring the physical downlink control channel (PDCCH) again. After sending heartbeats, the RRC connection can be maintained or released. If the UE is moving, handovers may be required. If the UE is in the RRC_idle state, the UE will have to setup a RRC connection before sending heartbeats. If in idle state, no handover but standard idle mode signalling will be required when the UE is moving. That means, that when the UE is RRC_Connected with cDRX switched on, "going up" refers to switching off cDRX while staying RRC_Connected.

Existing DRX handling of UEs in RRC_Connected state offers a service based selection of the DRX profile following UE's bearer mix. No specific considerations are made with regard to the setting of the RRC release timer of the UE, i.e., it is intended to keep the UE in RRC_Connected state independent of the UE's current traffic characteristics and mobility situation. The RRC release timer dictates the time period of data inactivity the UE is allowed to stay in RRC_Connected. At expiry of RRC release timer, UE is sent to RRC_Idle. This approach provides solid performance in terms of battery savings and service accommodation for the UEs but it does not provide the necessary specific handling on the eNodeB side for smart phones. Another proposal exists according to which the RRC release timer is set based solely on the UE speed. However, the relation between UE's mobility and data traffic demands is left out of this proposal.

In order to avoid the above mentioned issues, a method is provided for RRC connection release and setup considering also mobility and data traffic characteristic. The method adds to the existing DRX handling the necessary specific handling for UEs, for instance smart phones, mainly running always-on type of applications during DRX operation. The traffic characteristics and the current mobility of these UEs may be now considered in order to decide about keeping the UE in RRC_Connected state or not.

The method may offer the possibility to regulate the amount of control signalling caused to the eNodeB by smart phones running always-on type of applications while in cDRX mode in RRC_Connected. Depending on the HO frequency and the time period between consecutive data transactions of the UE, it may be decided whether it is profitable from a control signalling point of view to keep the UE in RRC_connected state or send it to RRC_idle state. The method may offer a control mechanism for the trade-off between a combined RRC connection procedure (RRC connection release and subsequent RRC connection setup) and a HO procedure.

The term "base station" in this context may denote any kind of physical entity being able to communicate with a user equipment or any other network device controlling a radio resource connection between them. A base station in this context may be any kind of network device providing the required functionality for the method, it may also be a transceiver node in communication with a centralized entity. The base station may be for example a NodeB or eNB.

The term "user equipment" (UE) in this context may denote any type of communication end device, which is capable of connecting with the described base station. For instance, the UE may be a cellular mobile phone, a Personal Digital Assistant (PDA), a notebook computer, a printer and/or any other movable communication device. In particular, in the context of this application, a UE may be any kind of communication device, for example a smart phone, being able to run so called always-on applications. Always-on applications in this context may denote applications requiring regularly transmitted control messages, also called keep-alive messages.

According to an embodiment of the invention, the data traffic characteristic is dependent on the control messages being required for the application running on the user equipment.

For determining the data traffic representing the data traffic characteristic, the control messages for the application running on the user equipment may be considered. These control messages represent data traffic and no control signalling. Also more than one application running on the UE may be considered.

According to a further embodiment of the invention, the first value being indicative for the data traffic characteristic of the user equipment is determined by an average heartbeat time being defined as the average time period between two control messages.

The first value of the UE's current data traffic characteristics may be represented by the average UE heartbeat time $\bar{t}_{HB}$. It may be defined as the time period between two data transactions regardless the direction (UL or DL), thus marking an average data inactivity period for the UE. Neither MAC CEs nor SRB signalling are regarded as data transactions.

According to a further embodiment of the invention, the average heartbeat time is determined by the user equipment and communicated to the base station.

The UE may comprise means to determine and notify an average heartbeat time to the base station. The UE may determine the average heartbeat time, and may communicate the average heartbeat time via RRC signalling to the serving base station. During HO, the UE may communicate the average heartbeat time via RRC signalling to the target base station, and the source base station may communicate the UE's average heartbeat time to the target base station via X2. Thus, the accuracy of the calculated average heartbeat time may be increased during UE operation in the cell, and in addition a solid starting value may be provided to the target base station during handover.

According to a further embodiment of the invention, the average heartbeat time is determined by the base station after establishment of the radio resource control connection between the base station and the user equipment.

The average UE heartbeat time may be calculated by the base station starting from the first RRC connection established for this UE (either coming from idle state or after HO). Typically, smart phones run multiple always-on applications in parallel, each of these application having its own (and mostly different) heartbeat time unknown to the base station. Thus, an average heartbeat time value should be used in order to take into account all applications.

According to a further embodiment of the invention, the mobility characteristic is dependent on handovers carried out by the user equipment in a predefined period.

By considering the number of last handovers during a specific period, a mobility characteristic, i.e., a property of the UE showing the movements of the UE, may be determined. This mobility characteristic is based on a number of changes between cells. The time period may be predefined.

According to a further embodiment of the invention, the second value being indicative for the mobility characteristic of the user equipment is determined by an average handover time being calculated based on a time period the user equipment stayed in each of a predefined amount of cells and based on a size of the corresponding cell.

When performing handover(s), UE's recent mobility history may be exchanged between the two participating base stations. This mobility history may contain (among other things) the time tcell the UE spent in each of the last, for example 16, cells and the corresponding cell size ("very small", "small", "medium", "large", . . . ). With the variable ISD marking the inter-site-distance, and assuming the radius $$r_{celli} = \frac{ISD}{3} = \begin{cases} 166.67 \text{ m,} & \text{for very small cells} \\ 566.67 \text{ m,} & \text{for small cells} \\ 1000 \text{ m,} & \text{for medium cells} \\ 3000 \text{ m,} & \text{for large cells} \end{cases},$$

$$i = 1 \ldots 16$$

of cell i, the cell-size-specific scaling factor $$(sf)_i = \begin{cases} 166.67 \text{ m}/3000 \text{ m} = 0.056, & \text{for very small cells} \\ 566.67 \text{ m}/3000 \text{ m} = 0.19, & \text{for small cells} \\ 1000 \text{ m}/3000 \text{ m} = 0.33, & \text{for medium cells} \\ 1, & \text{for large cells} \end{cases},$$

$$i = 1 \ldots 16,$$

may be defined and calculated at the base station. With $(sf)_i$ and the time $t_{cell}$ the UE stayed in each cell, the UE specific average handover (HO) time may be calculated at the base station as $$\bar{t}_{HO} = \frac{1}{t} \cdot \sum_{i=1}^{16} \left(\frac{t_{cell}}{sf}\right)_i$$

According to a further embodiment of the invention, comparing the first value and the second value corresponds to a comparison of an average handover time and an average heartbeat time.

The first value being indicative for a data traffic characteristic and the second value being indicative for a mobility characteristic may be calculated or determined as an average heartbeat time and an average handover time. Thus, for determining a value for the release timer, the average heartbeat time and the average handover time may be compared. Based on this, a decision may be made if it is better to keep the UE longer connected and to accept handovers or to end the RRC connection and to accept new connection setups but avoiding handovers. Thus, the best solution may be found for a specific UE. The release timer may be changed, especially if the UE starts new applications requiring another heartbeat frequency or if the UE changes its mobility behaviour.

According to a further embodiment of the invention, if the average handover time is greater than or equal to the average heartbeat time, the value of the release timer is greater than, if the average handover time is smaller than the average heartbeat time.

For instance, the base station may set the RRC release timer of the UE as follows:

A: For $\bar{t}_{HO} \geq \bar{t}_{HB}$, i.e., the UE does heartbeats more often than it does HOs, the base station may keep the UE in RRC_Connected as long as possible and provide for a safe HO at a manageable base station control signalling load. Thus in this case, the RRC release timer may be set to a rather large value preferably in the order of minutes.

According to a further embodiment of the invention, if the average handover time is smaller than the average heartbeat time, the value of the release timer may be set to a small value in the order of seconds.

For instance, the base station may set the RRC release timer of the UE as follows:

B: For $\bar{t}_{HO} < \bar{t}_{HB}$, i.e., the UE does HOs more often than it does heartbeats, the base station may send the UE to the RRC_idle state. This way, the base station may basically trade HO procedures for less costly (in terms of control signalling) combined RRC Connection Release & Setup procedures, thus reducing control signalling load. The reduction percentage may depend on the number of cells the UE passed through while being in RRC_idle state, which represents the number of saved HOs. In this case, the RRC release timer may be set to a rather small value preferably in the order of seconds.

UEs obeying criterion A, as mentioned above, would usually be static to low speed UEs such as laptops, dongles and handhelds moving at pedestrian velocity or a bit faster. The HO frequency of such UEs would be rather low and therefore would not cause severe load to the base station. On the other hand, UEs obeying criterion B would usually be medium to high speed UEs.

According to a second aspect of the invention, there is provided a base station for controlling a radio resource control connection between the base station and a user equipment, wherein a radio resource control connection between the base station and the user equipment is established for exchanging control messages between the base station and the user equipment, the control messages being required for an application running on the user equipment. The base station comprises a determination unit being adapted to determine a first value being indicative for a mobility characteristic of the user equipment and a second value being indicative for a data traffic characteristic of the user equipment, a comparison unit being adapted to compare the first value and the second value, and a control unit being adapted to set a release timer based on the comparison and being adapted to control the radio resource control connection based on the release timer, wherein the radio resource control connection will end upon expiry of the release timer.

The base station may be any type of access point or point of attachment, which is capable of providing a wireless access to a cellular network system. Thereby, the wireless access may be provided for a user equipment or for any other network element, which is capable of communicating in a wireless manner. The base station may be a NodeB, eNB, home NodeB or HeNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver. The transceiver or the receiving unit and the sending unit may be adapted to communicate with the user equipment via an antenna.

The base station further comprises a determination unit, a comparison unit and a control unit. The determination unit, the comparison unit and the control unit may be implemented as single units or may be implemented for example as part of a standard control unit, like a CPU or a microcontroller.

As described above, the base station may determine a release timer for a user equipment. The release timer may indicate how long the UE should stay connected to the base station via a RRC connection and when the connection should be released. The base station may set the release timer based on a mobility characteristic and a data traffic characteristic of the user equipment.

According to a third aspect of the invention, there is provided a user equipment being adapted to communicate with a base station as described above.

The user equipment (UE) may be any type of communication end device, which is capable of connecting with the described base station. The UE may be in particular a cellular mobile phone, a Personal Digital Assistant (PDA), a notebook computer, a printer and/or any other movable communication device. In particular, in the context of this application, a UE may be any kind of communication device, for example a smart phone, being able to run so called always-on applications. Always-on applications in this context may denote applications requiring regularly transmitted control messages, also called keep-alive messages.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver. The transceiver or the receiver and the transmitting unit may be adapted to communicate with the base station via an antenna.

The user equipment may further comprise a control unit being adapted to determine an average heartbeat time as mentioned above. The control unit may be further adapted to control the RRC connection between the user equipment and the base station, in particular based on the release timer set by the base station. The release timer may be communicated to the user equipment or an expiring of the release timer may be communicated to the user equipment implicitly by ending the RRC connection. The control unit may be implemented as a single unit or may be implemented for example as part of a standard control unit, like a CPU or a microcontroller.

According to a fourth aspect of the invention, there is provided a cellular network system. The cellular network system comprises a base station as described above.

Generally herein, the method and embodiments of the method according to the first aspect may include performing one or more functions described with regard to the second, third or fourth aspect or an embodiment thereof. Vice versa, the base station, user equipment or cellular network system and embodiments thereof according to the second and third aspect may include units or devices for performing one or more functions described with regard to the first aspect or an embodiment thereof.

According to a fifth aspect of the herein disclosed subject-matter, a computer program for controlling a radio resource connection between a base station and a user equipment is provided, the computer program being adapted for, when executed by a data processor assembly, controlling the method as set forth in the first aspect or an embodiment thereof.

As used herein, reference to a computer program is intended to be equivalent to a reference to a program element and/or a computer readable medium containing instructions for controlling a computer system to coordinate the performance of the above described method.

The computer program may be implemented as computer readable instruction code by use of any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The computer program may be available from a network, such as the World Wide Web, from which it may be downloaded.

The herein disclosed subject matter may be realized by means of a computer program respectively software. However, the herein disclosed subject matter may also be realized by means of one or more specific electronic circuits respectively hardware. Furthermore, the herein disclosed subject matter may also be realized in a hybrid form, i.e. in a combination of software modules and hardware modules.

In the above there have been described and in the following there will be described exemplary embodiments of the subject matter disclosed herein with reference to a cellular network system, a base station, a user equipment and a method of for controlling a radio resource connection between a base station and a user equipment. It has to be pointed out that of course any combination of features relating to different aspects of the herein disclosed subject matter is also possible. In particular, some embodiments have been described with reference to apparatus type embodiments whereas other embodiments have been described with reference to method type embodiments. However, a person skilled in the art will gather from the above and the following description that, unless otherwise notified, in addition to any combination of features belonging to one aspect also any combination between features relating to different aspects or embodiments, for example even between features of the apparatus type embodiments and features of the method type embodiments is considered to be disclosed with this application.

The aspects and embodiments defined above and further aspects and embodiments of the present invention are apparent from the examples to be described hereinafter and are explained with reference to the drawings, but to which the invention is not limited.

BRIEF DESCRIPTION OF THE DRAWING

It is noted that in different figures, similar or identical elements are provided with the same reference signs.

DETAILED DESCRIPTION

In the following, embodiments of the herein disclosed subject matter are illustrated with reference to the drawings and reference to aspects of current standards, such as LTE, and their further developments. However, such reference to current standards is only exemplary and should not be considered as limiting the scope of the claims.

Figure 1:
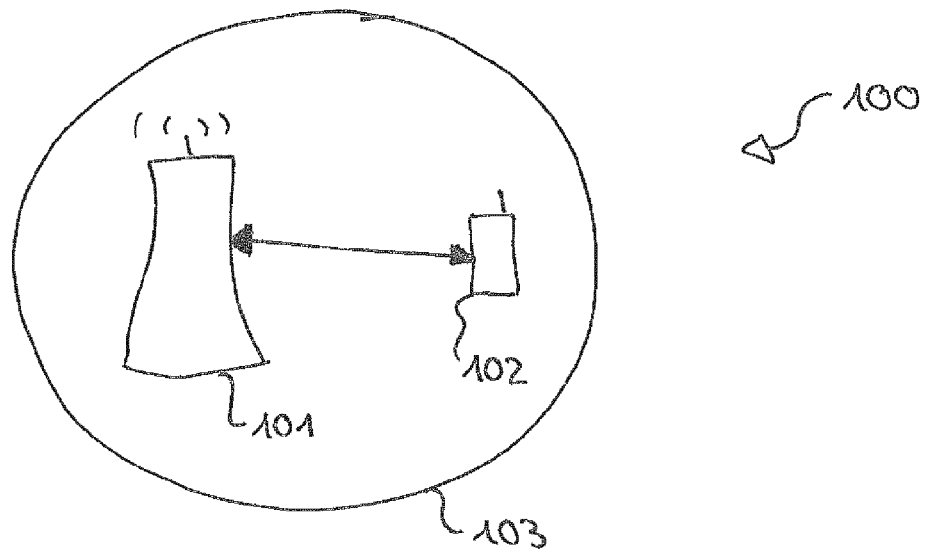
FIG. 1 shows a cellular network system according to an exemplary embodiment of the present invention.

FIG. 1 shows a cellular network system 100. A user equipment 102 is served by a first cell 103 of the cellular network system. The first cell is assigned to a base station 101.

The user equipment (UE) 102 may have several applications running, for instance also always-on applications, which require control messages to be exchanged between the user equipment and the network, i.e., the base station. For exchanging these control messages, a radio resource control (RRC) connection may be established between the base station 101 and the user equipment 102.

For deciding, whether to maintain the RRC connection and to perform eventually handovers (HO) or whether to release the RRC connection and to perform a RRC reconnection when necessary, a first value being indicative for a mobility characteristic of the user equipment and a second value being indicative for a data traffic characteristic of the user equipment may be determined. The first value and the second value may be compared and a release timer may be set based on the comparison. The RRC connection may then be controlled based on the release timer, wherein the radio resource control connection will end upon expiry of the release timer.

This method is based on the fact that keeping the UE longer RRC_connected means that handovers (HOs) must be executed, the frequency of the HO depending of course on the UE speed and the cell size on UE's route. On the other hand, releasing the RRC connection as fast as possible may lead to a high rate of RRC setups and releases.

According to the described method, the traffic characteristics and the current mobility of the UEs, running in particular always-on applications, are now considered in order to decide about keeping the UE in RRC_connected state or not. The method may offer the possibility to regulate the amount of control signalling caused to the base station by UEs, for instance smart phones running always-on type of applications, while in cDRX mode in RRC_connected state. Depending on the HO frequency and the time period between consecutive data transactions of the UE, it may be decided whether it is profitable from a control signalling point of view to keep the UE in the RRC_connected state or send it to RRC_idle state.

In the following, one possible implementation of the invention is described. As mentioned above, in order to alleviate the control signalling generated on the eNodeB by smart phones running always-on applications together with cDRX, the eNodeB can control the trade-off between the combined RRC Connection procedures (RRC Connection Release and subsequent RRC Connection Setup) and HOs. This may be seen as a decision of keeping the UE RRC-connected or releasing the UE and send it to RRC_idle state as soon as possible. The outcome of this decision may corresponding to setting UE's RRC release timer to either a rather long value (in the order of minutes) or a rather short one (in the order of seconds). The decision itself is based on the comparison between UE's recent mobility history and its current data traffic characteristics.

Figure 2:
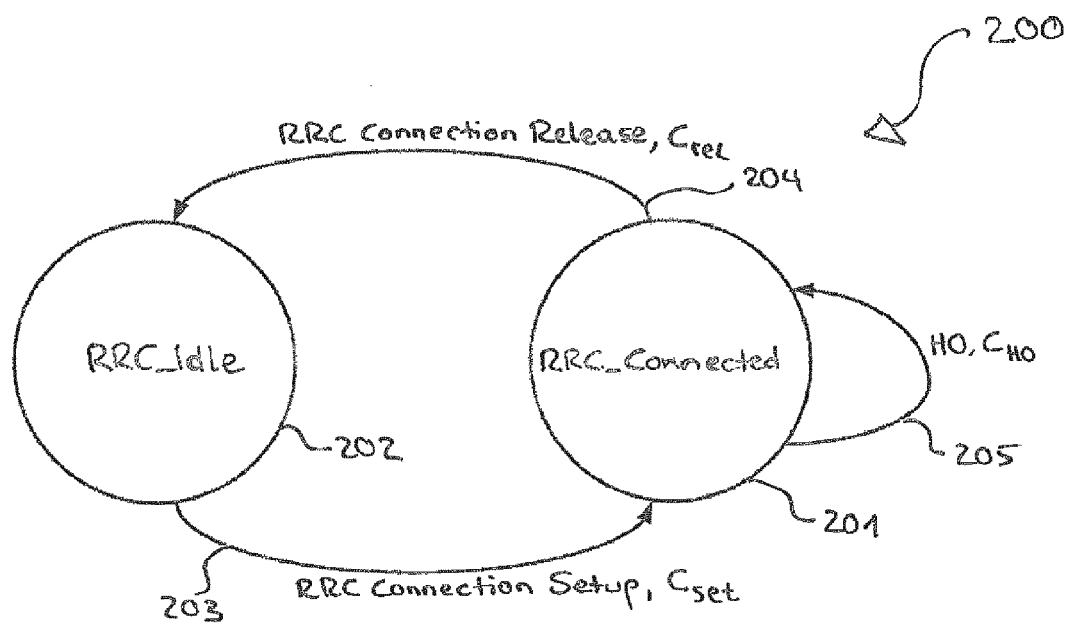
FIG. 2 shows a state transition model of a user equipment.

FIG. 2 illustrates the RRC state transition situation 200 and the respective signalling. When the UE is RRC-connected 201, it may be either kept in this state or the RRC connection may be released 204 by a respective signalling, according to the described method after expiring of the release timer. If the UE is kept in the RRC-connected state 201, handovers may occur 205. If the UE is released, it is transferred to the RRC-idle state 202. If the UE is in the RRC-idle state 202 and exchange of control messages for an application is required, the RRC connection may be setup 203.

The different states and transitions correspond to cost functions representing the control signalling cost in terms of base station processor load. For instance, a HO may cause 15% more load as compared to a combined RRC release and setup procedure, i.e. the regular case is $C_{HO} > (C_{rel} + C_{set})$. This is based on a consideration of all messages exchanged between base station (base stations in case of handovers) and UE and also between base stations and MME. This minimum value of 15% may occur in the case when just one HO is traded for one combined RRC release and setup procedure. For medium to high speed UEs, it is expected that at least two or three HOs will be traded for one combined RRC release and setup procedure. This case of course results to massive control signalling savings for the eNodeB or base station.

By the described method and system, an optimization of DRX procedures due to the addition of smart phone related functionality may be achieved. Further, control signalling generated to the base station side by smart phones in the network may be contained. Average heartbeat time can be used by the operator to define appropriate DRX profile parameters in order to optimize the average battery consumption by the UEs.

Figure 3:
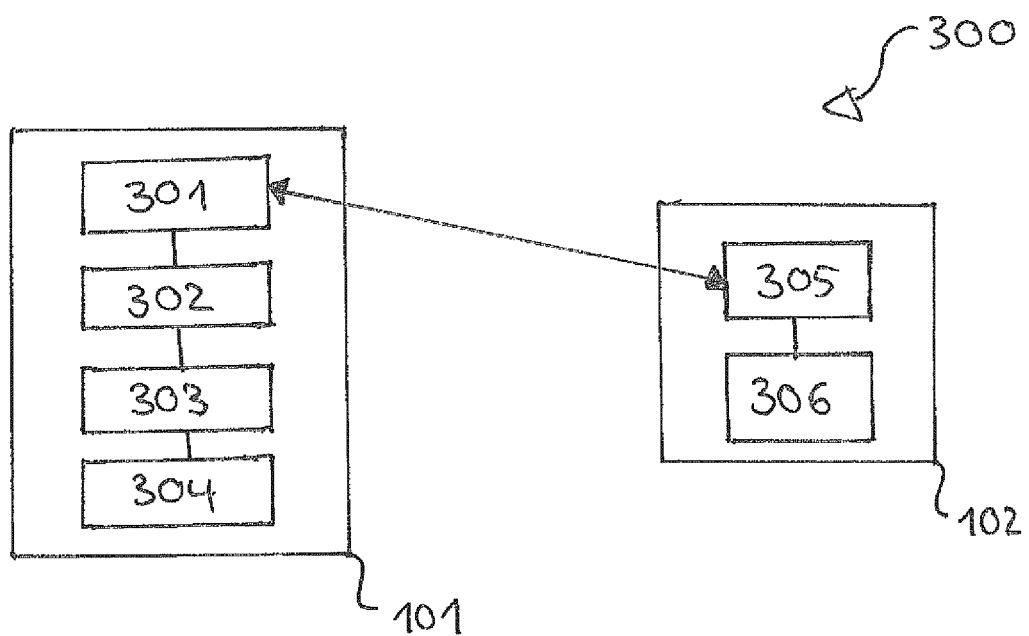
FIG. 3 shows a base station and a user equipment within a cellular network system according to an exemplary embodiment of the invention.

FIG. 3 shows a cellular network system 300 according to an exemplary embodiment of the invention. The cellular network system comprises a base station 101 and a user equipment 102 being served by the base station.

The base station may control a radio resource control connection between the base station 101 and the user equipment 102. Such a radio resource control connection can be established for exchanging control messages between the base station and the user equipment, the control messages being required for an application running on the user equipment.

The base station 101 comprises a determination unit 302, a comparison unit 303, and a control unit 304. The determination unit 302 is adapted to determine a first value being indicative for a mobility characteristic of the user equipment 102 and a second value being indicative for a data traffic characteristic of the user equipment 102. The comparison unit is adapted to compare the first value and the second value. The control unit is adapted to set a release timer based on the comparison and is further adapted to control the radio resource control connection based on the release timer, wherein the radio resource control connection will end upon expiry of the release timer.

The base station may be any type of access point or point of attachment, which is capable of providing a wireless access to a cellular network system. Thereby, the wireless access may be provided for the user equipment, or for any other network element, which is capable of communicating in a wireless manner. The base station may be a NodeB, eNB, home NodeB or HeNB, or any other kind of access point.

The base station may comprise a receiving unit, for example a receiver as known by a skilled person. The base station may also comprise a transmitting or sending unit, for example a transmitter. The receiver and the transmitter may be implemented as one single unit, for example as a transceiver 301. The transceiver or the receiving unit and the sending unit may be adapted to communicate with the user equipment via an antenna.

The determination unit 302, the comparison unit 303 and the control unit 304 may be implemented as single units or may be implemented for example as part of a standard control unit, like a CPU or a microcontroller.

The user equipment (UE) may be any type of communication end device, which is capable of connecting with the described base station. The UE may be in particular a cellular mobile phone, a Personal Digital Assistant (PDA), a notebook computer, a printer and/or any other movable communication device. In particular, in the context of this application, a UE may be any kind of communication device, for example a smart phone, being able to run so called always-on applications. Always-on applications in this context may denote applications requiring regularly transmitted control messages, also called keep-alive messages.

The user equipment may comprise a receiving unit or receiver which is adapted for receiving signals from the base station. The user equipment may comprise a transmitting unit for transmitting signals. The transmitting unit may be a transmitter as known by a skilled person. The receiver and the transmitting unit may be implemented as one single unit, for example as a transceiver 305. The transceiver or the receiver and the transmitting unit may be adapted to communicate with the base station via an antenna.

The user equipment may further comprise a control unit 306 being adapted to determine an average heartbeat time as mentioned above. The control unit may be further adapted to control the RRC connection between the user equipment and the base station, in particular based on the release timer set by the base station. The release timer may be communicated to the user equipment or an expiring of the release timer may be communicated to the user equipment implicitly by ending the RRC connection. The control unit may be implemented as a single unit or may be implemented for example as part of a standard control unit, like a CPU or a microcontroller.

Having regard to the subject matter disclosed herein, it should be mentioned that, although some embodiments refer to a "base station", "eNB", etc., it should be understood that each of these references is considered to implicitly disclose a respective reference to the general term "network component" or, in still other embodiments, to the term "network access node". Also other terms which relate to specific standards or specific communication techniques are considered to implicitly disclose the respective general term with the desired functionality.

It should further be noted that a base station as disclosed herein is not limited to dedicated entities as described in some embodiments. Rather, the herein disclosed subject matter may be implemented in various ways in various locations in the communication network while still providing the desired functionality.

According to embodiments of the invention, any suitable entity (e.g. components, units and devices) disclosed herein, e.g. the control unit, are at least in part provided in the form of respective computer programs which enable a processor device to provide the functionality of the respective entities as disclosed herein. According to other embodiments, any suitable entity disclosed herein may be provided in hardware. According to other—hybrid—embodiments, some entities may be provided in software while other entities are provided in hardware.

It should be noted that any entity disclosed herein (e.g. components, units and devices) are not limited to a dedicated entity as described in some embodiments. Rather, the herein disclosed subject matter may be implemented in various ways and with various granularities on device level while still providing the desired functionality. Further, it should be noted that according to embodiments a separate entity (e.g. a software module, a hardware module or a hybrid module) may be provided for each of the functions disclosed herein. According to other embodiments, an entity (e.g. a software module, a hardware module or a hybrid module (combined software/hardware module)) is configured for providing two or more functions as disclosed herein.

It should be noted that the term "comprising" does not exclude other elements or steps. It may also be possible in further refinements of the invention to combine features from different embodiments described herein above. It should also be noted that reference signs in the claims should not be construed as limiting the scope of the claims.

LIST OF REFERENCE SIGNS

100 Cellular network system
101 Base station
102 User equipment
103 Cell
200 State transition model
201 RRC connected state
202 RRC idle state
203 RRC connection setup
204 RRC connection release
205 Handover
400 Cellular network system
401 Transceiver of the base station
402 Determination unit of the base station
403 Comparison unit of the base station
404 Control unit of the base station
405 Transceiver of the user equipment
406 Control unit of the user equipment

The invention claimed is:

1. A method for controlling a radio resource control connection between a base station and a user equipment, wherein a radio resource control connection between the base station and the user equipment is established for exchanging control messages between the base station and the user equipment, the control messages being required for an application running on the user equipment, the method comprising:
   determining a first value being indicative for a mobility characteristic of the user equipment and a second value being indicative for a data traffic characteristic of the user equipment,
   comparing the first value and the second value,
   setting a release timer based on the comparison, and
   controlling the radio resource control connection based on the release timer, wherein the radio resource control connection will end upon expiry of the release timer.

2. The method as set forth in claim 1, wherein the data traffic characteristic is dependent on the control messages being required for the application running on the user equipment.

3. The method as set forth in claim 2, wherein the first value being indicative for the data traffic characteristic of the user equipment is determined by an average heartbeat time being defined as the average time period between two control messages.

4. The method as set forth in claim 3, wherein the average heartbeat time is determined by the user equipment and communicated to the base station.

5. The method as set forth in claim 3, wherein the average heartbeat time is determined by the base station after establishment of the radio resource control connection between the base station and the user equipment.

6. The method as set forth in claim 1, wherein the mobility characteristic is dependent on handovers carried out by the user equipment in a predefined period.

7. The method as set forth in claim 6, wherein the second value being indicative for the mobility characteristic of the user equipment is determined by an average handover time being calculated based on a time period the user equipment stayed in each of a predefined amount of cells and based on a size of the corresponding cell.

8. The method as set forth in claim 1, wherein comparing the first value and the second value corresponds to a comparison of an average handover time and an average heartbeat time.

9. The method as set forth in claim 8, wherein, if the average handover time is greater than or equal to the average heartbeat time, the value of the release timer is greater than, if the average handover time is smaller than the average heartbeat time.

10. A base station for controlling a radio resource control connection between the base station and a user equipment, wherein a radio resource control connection between the base station and the user equipment is established for exchanging control messages between the base station and the user equipment, the control messages being required for an application running on the user equipment, the base station comprising:
 a determination unit being adapted to determine a first value being indicative for a mobility characteristic of the user equipment and a second value being indicative for a data traffic characteristic of the user equipment,
 a comparison unit being adapted to compare the first value and the second value, and
 a control unit being adapted to set a release timer based on the comparison and being adapted to control the radio resource control connection based on the release timer, wherein the radio resource control connection will end upon expiry of the release timer.

11. A cellular network system, the cellular network system comprising a base station as set forth in claim 10.

12. An apparatus comprising:
 a processor;
 a memory comprising instruction code, wherein the memory and the instruction code are configured to, with the processor, cause the apparatus to:
 determine a first value being indicative for a mobility characteristic of a user equipment and a second value being indicative for a data traffic characteristic of the user equipment;
 compare the first value and the second value;
 set a release timer based on the comparison; and
 control a radio resource control connection based on the release timer, wherein the radio resource control connection will end upon expiry of the release timer, wherein the radio resource control connection is between a base station and the user equipment and is established for exchanging control messages between the base station and the user equipment, the control messages being required for an application running on the user equipment.

13. The apparatus of claim 12, wherein the data traffic characteristic is dependent on the control messages being required for the application running on the user equipment.

14. The apparatus of claim 13, wherein the first value being indicative for the data traffic characteristic of the user equipment is determined by an average heartbeat time being defined as the average time period between two control messages.

15. The apparatus of claim 14, wherein the average heartbeat time is determined by the user equipment and communicated to the base station.

16. The apparatus of claim 14, wherein the average heartbeat time is determined by the base station after establishment of the radio resource control connection between the base station and the user equipment.

17. The apparatus of claim 12, wherein the mobility characteristic is dependent on handovers carried out by the user equipment in a predefined period.

18. The apparatus of claim 17, wherein the second value being indicative for the mobility characteristic of the user equipment is determined by an average handover time being calculated based on a time period the user equipment stayed in each of a predefined amount of cells and based on a size of the corresponding cell.

19. The apparatus of claim 12, wherein comparing the first value and the second value corresponds to a comparison of an average handover time and an average heartbeat time.

20. The apparatus of claim 19, wherein, if the average handover time is greater than or equal to the average heartbeat time, the value of the release timer is greater than, if the average handover time is smaller than the average heartbeat time.

* * * * *